Oct. 7, 1941.   B. F. PARR ET AL   2,258,144
COOKING APPLIANCE
Filed Nov. 30, 1938

WITNESSES:
R. J. Eisinger
C. L. Wheler

INVENTOR
B. F. PARR & J. R. HEILMAN.
BY W Asteiga
ATTORNEY

Patented Oct. 7, 1941

2,258,144

UNITED STATES PATENT OFFICE 2,258,144

COOKING APPLIANCE

Bernard F. Parr and Joseph R. Heilman, Mansfield, Ohio, assignors to Westinghouse Electric & Manufacturing Company, East Pittsburgh, Pa., a corporation of Pennsylvania Application November 30, 1938, Serial No. 243,285

3 Claims. (Cl. 219—35)

Our invention relates to a cooking appliance, more particularly to a heating unit which comprises a heating element and a cooking platform disposed above the heating element, the heating element providing radiant heat for heating said platform when the unit is used for frying or other cooking on said platform and radiating heat downwardly for broiling articles of food beneath the heating unit.

An object of our invention is to provide an improved heating unit of the character set forth.

A more particular object is to provide a heating unit providing sufficient cooking speed both when the heating unit is used for broiling food beneath the heating unit and when used for cooking on the cooking platform.

A further object is to direct the heat generated by the heating element to the cooking platform, when the heating unit is used for cooking on said platform.

The above recited and other objects are effected by our invention as will be apparent from the following description and claims taken in connection with the accompanying drawing, forming a part of this application, in which:

Figure 1:
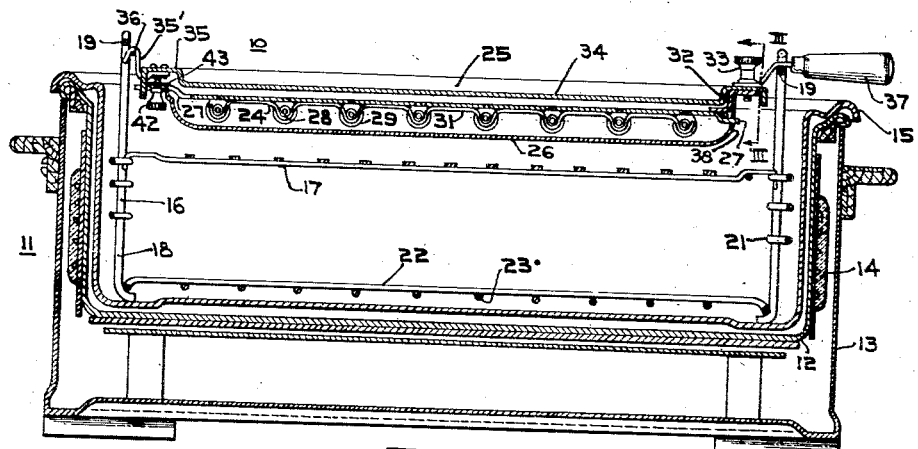
Fig. 1 is a longitudinal sectional view of a cooking appliance incorporating a heating unit in accordance with our invention.
Figure 2:
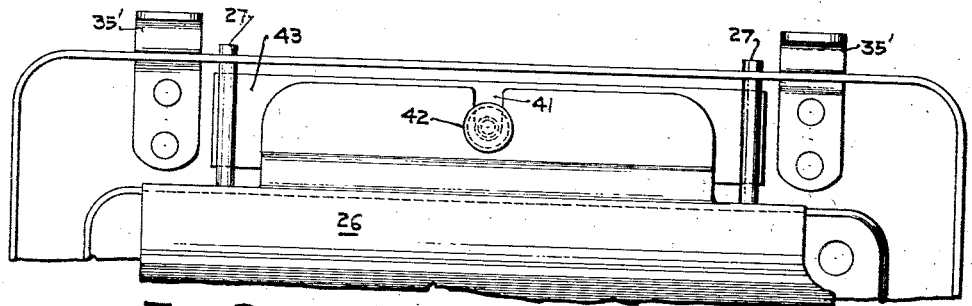
Fig. 2 is an enlarged bottom plan view of the end of the heating unit which is disposed at the left in Fig. 1.

Referring to the drawing in detail, we show a heating unit 10 used in conjunction with an electric roaster body 11 in a manner similar to that described and claimed in the patent of William J. Russell and Kenneth L. Woodman, No. 2,156,-216, April 25, 1939. The roaster body comprises an inner casing 12 and an outer casing 13. The inner and outer casings provide bottom, side, and end walls for the roaster body, the corresponding wall portions thereof being arranged in spaced relation. A heating element 14 is provided on the inner casing 12 as shown. A removable inset pan 15 may be provided within the inner casing 13. The open top of the roaster body is adapted to be closed by a suitable cover (not shown).

A rack 16 is provided within the roaster body for supporting the heating unit 10 adjacent the open top of the roaster body and also for supporting a shelf 17, which is in the form of a grill or grid for supporting the articles of food to be broiled.

The rack 16 comprises vertical members 18, the two vertical members at each end of the rack being connected at their upper ends by transverse members 19 which serve as handles for lifting the rack from the roaster body. Cross bars 21 are also attached to the vertical members at each end for supporting the shelf 17 at different heights below the heating unit 10. The rack 16 further comprises longitudinal members 22 and transverse members 23 providing a grill or platform for supporting food containers or articles of food to be heated by the heating element 14.

The heating element 10 comprises an open radiant heating element 24, a plate member 25 above the heating element, and a heat reflector 26 below the heating element. The plate member 25 provides a cooking platform and may be either a casting or, as shown, a flanged sheet metal member. The heating element 24 comprises frame members 27 and an electric resistance coil 28 carried by the frame members and insulated therefrom. For example, the coil 28 may extend through insulating grommets 29 secured to the frame members 27 by means of strap members 31.

The heating element is detachably connected to the plate member 25 in any suitable manner permitting ready separation thereof. For example, the frame members 27 of the heating element may extend through openings in the flange of the sheet metal plate member 25 at the left-hand end, as seen in Fig. 1, and a bracket 32 welded to the frame members at the right-hand end may be secured to the plate member by a thumb screw 33.

The sheet metal plate member 25 is dished to provide a central cooking surface 34 which is suitable for frying thereon and which is encompassed by a raised or rim portion 35. Hinge brackets 35' are connected to the plate member 25 at the left-hand end. The projecting portions of these brackets are of inverted U-shape, engaging a cross bar 36 attached to the vertical members 18 at the left-hand end of the rack. At the right-hand end, a handle 37 is mounted on the plate member in such manner that it may rotate about a vertical axis. In the illustrated embodiment, the handle 37 is adapted to rest on the transverse member 19 for supporting the right-hand end of the heating unit thereon. The heating unit is thus adapted to be swung upwardly about the cross bar 36 to provide access to the shelf 17.

Figure 3:
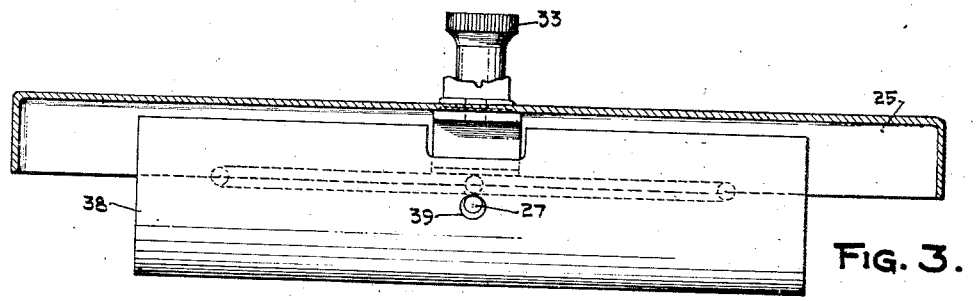
Fig. 3 is an end elevation, partially in section, taken on the line III—III of Fig. 1.

The heat reflector 26 is detachably mounted on the heating element 24. For example, in the illustrated embodiment, the heat reflector 26 is formed with an upturned flange 38 at the right hand end, and the central frame member 27 extends through an opening 39 formed in said flange, as shown in Figs. 1 and 3. At the left-hand end, the heat reflector 26 is provided with a recess or aperture 41, and a thumb screw 42 extends through said recess and through a tapped opening in a plate 43 welded to the frame members 27. The heat reflector 26 may therefore be readily detached by retracting the thumb screw 42 to release the heat reflector, then moving the latter to the right until the same disengages the thumb screw 42 and the frame member 27 is withdrawn from the opening 39.

To use the apparatus described above for broiling, the heat reflector 26 is removed and the parts are assembled in the manner shown in Fig. 1, the articles of food to be broiled being placed on the shelf 17 and the latter being positioned at a suitable height, dependent upon the nature of the food. Electric current is then supplied to the resistance coil 23 of the heating element in any suitable manner, as is well known in the art. The resistance coil 23 radiates heat in all directions, some of the heat radiated downwardly being received directly by the food for heating the same. The heat radiated upwardly is reflected downwardly by the lower surface of the plate member 25. The directly radiated and the reflected heat together provide sufficient heat for broiling the articles of food on the shelf 17.

When it is desired to use the heating unit 10 for frying or for other cooking on the plate member or cooking platform 25, the heat reflector 26 is attached and the parts assembled in the position shown in Fig. 1. The food to be fried or cooked is placed on the plate member 25 and electric current supplied to the resistance coil 28. In this case, a portion of the heat radiated upwardly by the coil 28 is absorbed by the lower surface of the plate member 25 for heating the same. The heat radiated downwardly by the resistance coil 28, and also the heat reflected downwardly by the lower surface of the plate member 25, is reflected upwardly by the upper surface of the heat reflector 26. In other words, the heat which is directed downwardly when broiling is now reflected upwardly to the plate member 25 to provide an adequate supply of heat for frying or other cooking on the platform provided by the plate member 25.

Figure 4:
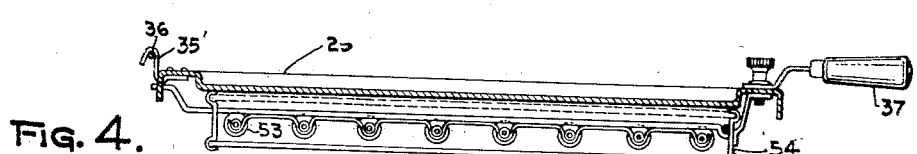
Fig. 4 is a longitudinal sectional view of a modified form of heating unit; and, Fig. 5 is an enlarged fragmentary view of a part of Fig. 1.
Figure 5:
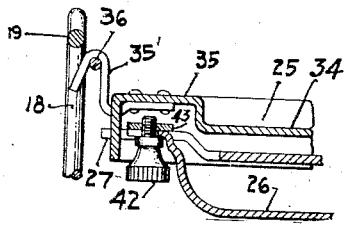

In Fig. 4, we show a modified form of heating unit which is used in the same manner as the heating unit of Fig. 1 and which is similar in construction except as otherwise noted. In this case, we provide a heat reflector or plate member 52. At least one surface of the plate 52 is a good heat reflecting surface, which is provided, for example, by nickel plating the plate 52. Provision is made for mounting the heat reflector 52 either above or below the heating element 53. For example, sheet metal strips 54 may be welded to the frame members of the heating element. The strips 54 are formed with grooves arranged as shown in Fig. 4, one set of grooves being adapted to support the plate 52 between the heating element and the plate member 25, and the other set of grooves being adapted to support the plate 52 below the heating element.

When the heating element of Fig. 4 is to be used for broiling, the plate 52 is placed in the upper position, shown in dotted lines, with the heat reflecting surface on the lower side. The heat radiated upwardly from the heating element is reflected downwardly by said surface to the articles of food to be broiled. When the heating unit is to be used for cooking on the plate member 25, the plate member 52 is placed below the heating element, as shown in full lines, with the heat reflecting surface on the upper side, so as to reflect radiant heat upwardly to the plate member 25, for heating the same.

It will thus be seen that we have provided a heating unit wherein the heat generated by the heating element may be directed either upwardly or downwardly in accordance with the nature of the cooking to be done by the heating unit. This is of particular advantage where there are limitations on the current that a device of this character may draw. The present device provides greater cooking speed on the cooking platform than has heretofore been obtained with such limitations.

While we have shown our invention in several forms, it will be obvious to those skilled in the art that it is not so limited but is susceptible of various changes and modifications without departing from the spirit thereof, and we desire, therefore, that only such limitations shall be placed thereupon as are imposed by the prior art or as are specifically set forth in the appended claims.

What we claim is:

1. In a cooking appliance, a heating unit for frying and broiling, said heating unit comprising a horizontal metal plate member whose upper surface includes a central frying surface and a raised portion encompassing the frying surface, an open radiant heating element attached to said plate member on the lower side thereof and forming a heating unit therewith, said heating element being adapted to radiate heat upwardly and downwardly, the lower surface of said plate member reflecting radiant heat downwardly when using the heating unit for broiling, and a reflector detachably connected to said heating unit on the lower side thereof for reflecting radiant heat upwardly to the lower surface of said plate member when using the heating unit for frying, said reflector having at one end an upturned flange provided with an opening therein and at its other end having a marginal portion which is substantially parallel to the main body of the reflector and which is formed with a slot extending inwardly from the edge of the marginal portion in the direction of said one end, said heating unit comprising an element projecting through said opening in the upturned flange and means, including a screw extending through said slot, for clamping said marginal portion to the heating unit, the parts being constructed and arranged so that, after said clamping means is loosened, said reflector may be moved longitudinally relative to the heating unit without completely removing any part of said clamping means from the heating unit and so that, upon such longitudinal movement, said projecting element and said screw are withdrawn from said opening and said slot, respectively, to detach the reflector from the heating unit.

2. In a cooking appliance, a heating unit for frying and broiling, said heating unit being separate from and movable as a unit in the cooking appliance and comprising a horizontal metal plate member whose upper surface includes a central frying surface and a raised surface encompassing the frying surface, an open radiant heating element attached to said plate member on the lower side thereof and forming a unit therewith, said heating element being adapted to radiate heat upwardly and downwardly, a second plate member having a heat reflecting surface, and means for selectively mounting said second plate member between said heating element and said first plate member, for reflecting radiant heat downwardly when the heating element is used for broiling articles of food below the heating element or mounting said second plate member below said heating element for reflecting radiant heat upwardly to said first plate member when the heating unit is used for cooking on the latter.

3. In a cooking appliance, a heating unit for frying and broiling, said heating unit comprising a horizontal metal plate member whose upper surface includes a central frying surface and a raised portion encompassing the frying surface, an open radiant heating element attached to said plate member on the lower side thereof and forming a heating unit therewith, said heating element being adapted to radiate heat upwardly and downwardly, the lower surface of said plate member reflecting radiant heat downwardly when using the heating unit for broiling, and a reflector detachably connected to said heating element on the lower side thereof for reflecting radiant heat upwardly to the lower surface of said plate member when using the heating unit for frying, said reflector having at one end an upturned flange provided with an opening therein and at its other end having a marginal portion which is substantially parallel to the main body of the reflector and which is formed with a slot extending inwardly from the edge of the marginal portion in the direction of said one end, said heating element having a projection extending through said opening in the upturned flange and means, including a screw extending through said slot, for clamping said marginal portion to the heating element, the parts being constructed and arranged so that, after said clamping means is loosened, said reflector may be moved longitudinally relative to the heating element without completely removing any part of said clamping means from the heating element and so that, upon such longitudinal movement, said projection and said screw are withdrawn from said opening and said slot, respectively, to detach the reflector from the heating element.

BERNARD F. PARR.
JOSEPH R. HEILMAN.